(No Model.)

S. J. DAWKINS.
STEAM FOUNTAIN FOR WASH BOILERS.

No. 375,134. Patented Dec. 20, 1887.

WITNESSES:
Jol. N. Rosenbaum.
Carl Kup

INVENTOR
Stephen J. Dawkins
BY
Goepel & Raegener
ATTORNEYS.

UNITED STATES PATENT OFFICE.

STEPHEN J. DAWKINS, OF BROOKLYN, NEW YORK.

STEAM-FOUNTAIN FOR WASH-BOILERS.

SPECIFICATION forming part of Letters Patent No. 375,134, dated December 20, 1887.

Application filed May 17, 1887. Serial No. 238,453. (No model.)

*To all whom it may concern:*

Be it known that I, STEPHEN J. DAWKINS, of Brooklyn, in the county of Kings and State of New York, have invented certain new and useful Improvements in Steam-Fountains for Wash-Boilers, of which the following is a specification.

This invention relates to that class of devices known as "fountains for wash-boilers," and which serve to produce currents of hot water in the boiler.

The object of my invention is to provide a new and improved fountain of this kind which is simple in construction and effective in use.

The invention consists in the combination, with a triangular casing provided with a longitudinal rib on its under side, of an inverted cup surrounding the casing and pipes projecting upward from the top of the casing.

The invention also consists in the construction and combination of parts and details, as will be fully described and set forth hereinafter, and then pointed out in the claims.

Figure 1:
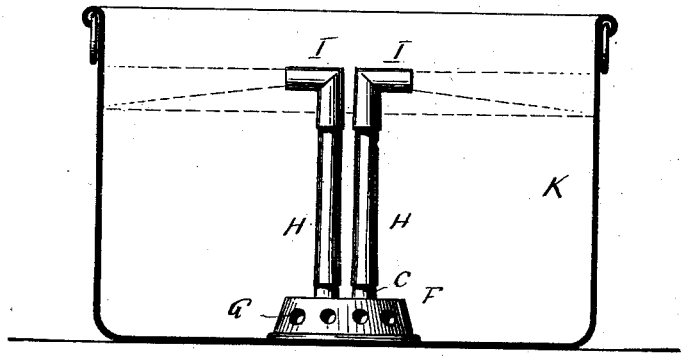
Figure 2:
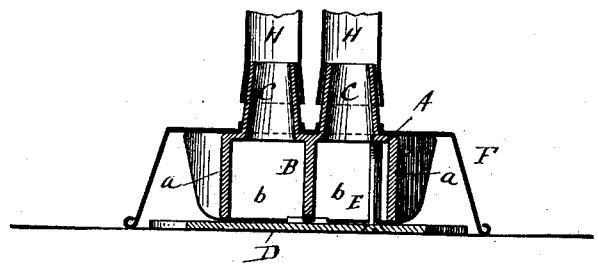
Figure 3:
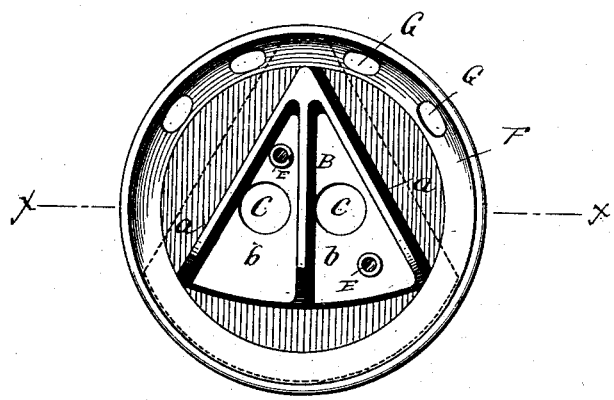
Figure 4:
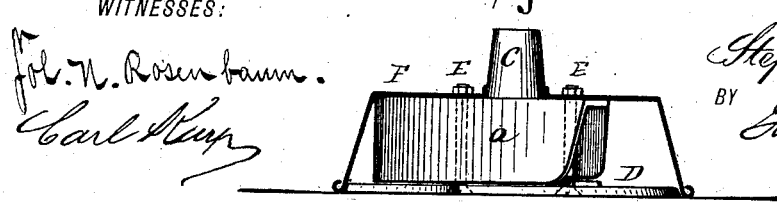

In the accompanying drawings, Figure 1 is an elevation of my improved steam-fountain for wash-boilers, the boiler being in section. Fig. 2 is a cross sectional view of the fountain on the line x x, Fig. 3. Fig. 3 is a plan view of the under side of the fountain, the base-plate being removed. Fig. 4 is a side view of the fountain, the inverted cup being in section.

Similar letters of reference indicate corresponding parts.

The triangular casing or base-piece A is made of cast-iron, and is provided with the two side walls, a a, the side opposite the apex being left open. A longitudinal central rib, B, is provided on the under side of the base-piece and forms two chambers, b, on the top of each of which a tapered neck, C, is formed. The casing A is placed upon the base-plate D, and is united with the same by the bolts E, passed through said base-plate, the top of the casing, and through the top of an inverted sheet-metal cup, F, which is placed upon the casing A and is provided with two openings for the necks E. Apertures G are formed in the sides of the inverted cup in that part facing the closed sides of the casing A. Vertical pipes H, provided with nozzles I on their upper ends, are placed upon the necks C, as shown.

The entire device is placed upon the bottom of a wash-boiler, K, the nozzles being above the level of the water. The hot water passes through the apertures G into the inverted cup F, passes to the open larger end of the casing A, and rises in the pipes H, passing out through the nozzles I, whereby a continuous circulation of the water is obtained in the boiler.

Having thus described my invention, I claim as new and desire to secure by Letters Patent—

1. The combination, with the triangular casing A, having the longitudinal rib B and the necks C, of pipes on the necks and of the inverted cup F, surrounding the casing A and provided with the apertures G, substantially as herein shown and described.

2. The combination, with the triangular casing A, having the longitudinal rib B and the necks C, of the inverted cup F, surrounding the casing and provided with the apertures G, the base-plate D, and the bolts E, passed through the base-plate, the top of the casing A, and the top of the inverted cup F, substantially as herein shown and described.

In testimony that I claim the foregoing as my invention I have signed my name in presence of two subscribing witnesses.

STEPHEN J. DAWKINS.

Witnesses:
CARL KARP,
MARTIN PETRY.